R. POWELL.
APPARATUS FOR MAKING AN UNDERGROUND PASSAGEWAY AND FOR MAKING AND LAYING A PIPE IN THE SAME.
APPLICATION FILED JAN. 26, 1918.
1,340,836.
Patented May 18, 1920.
5 SHEETS—SHEET 5.
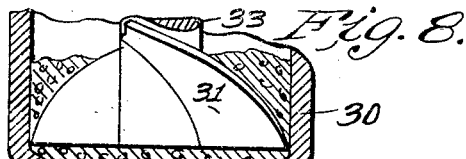
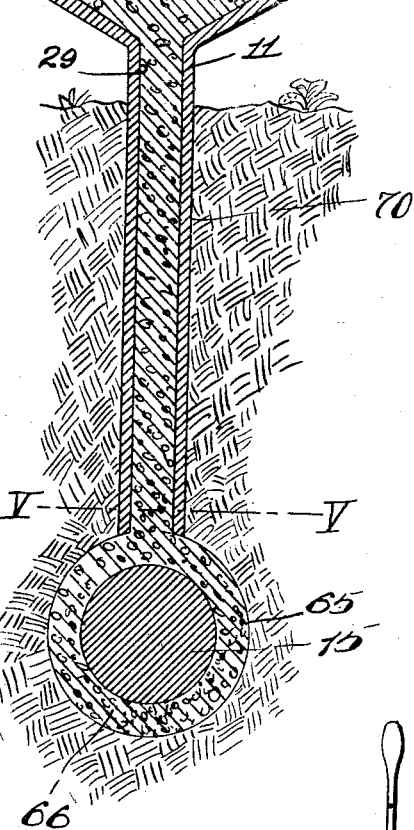
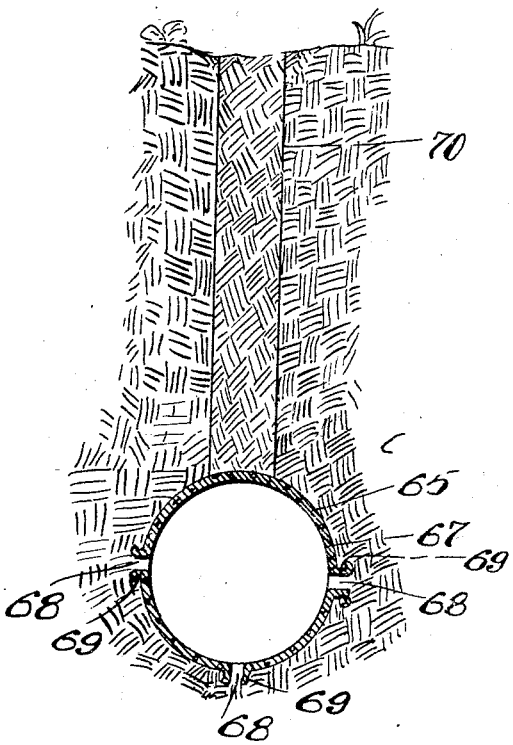
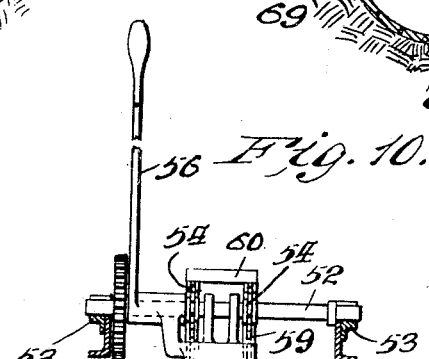
Inventor:
Robert Powell.
By L. G. Fletcher
atty.

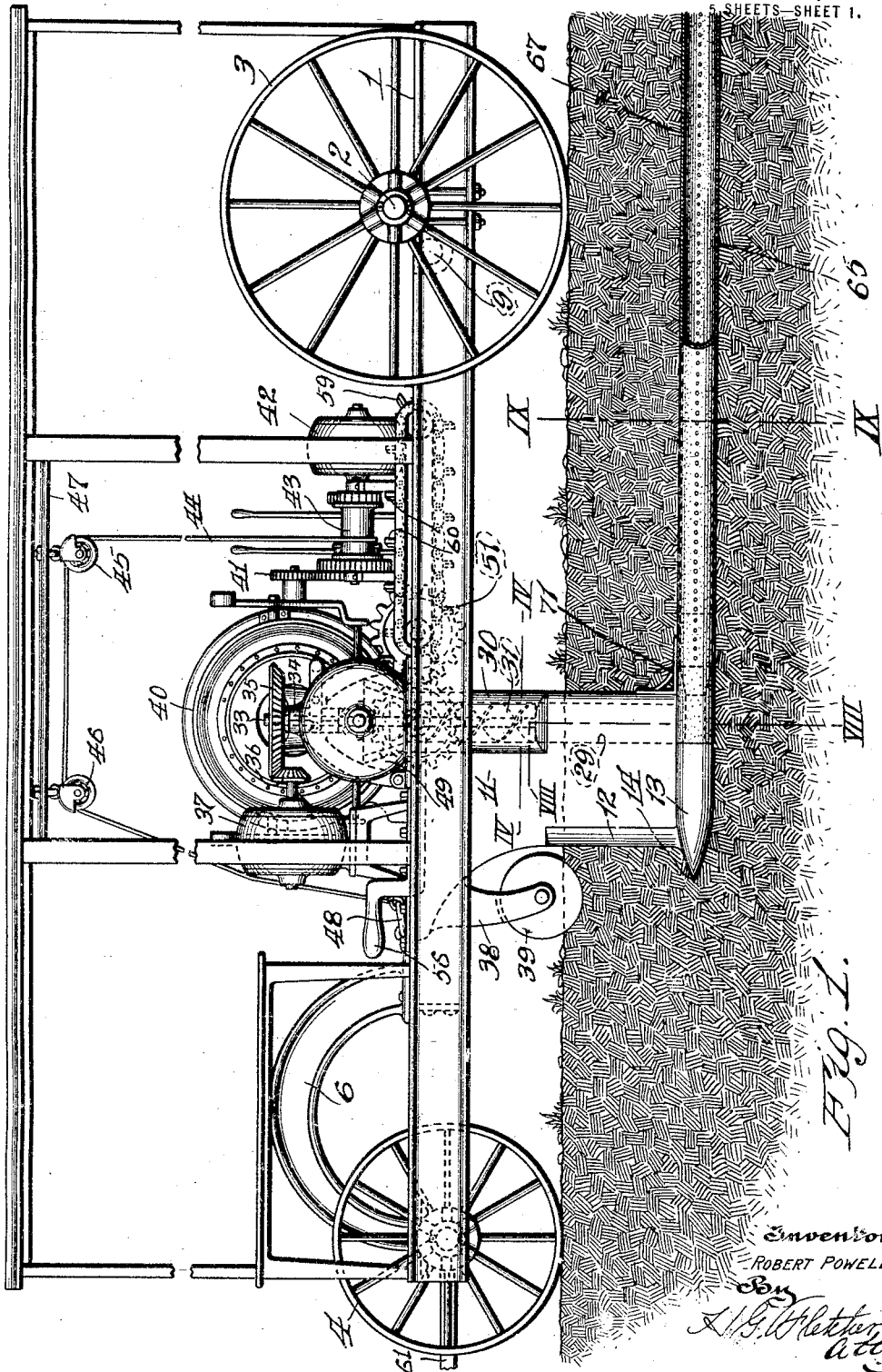

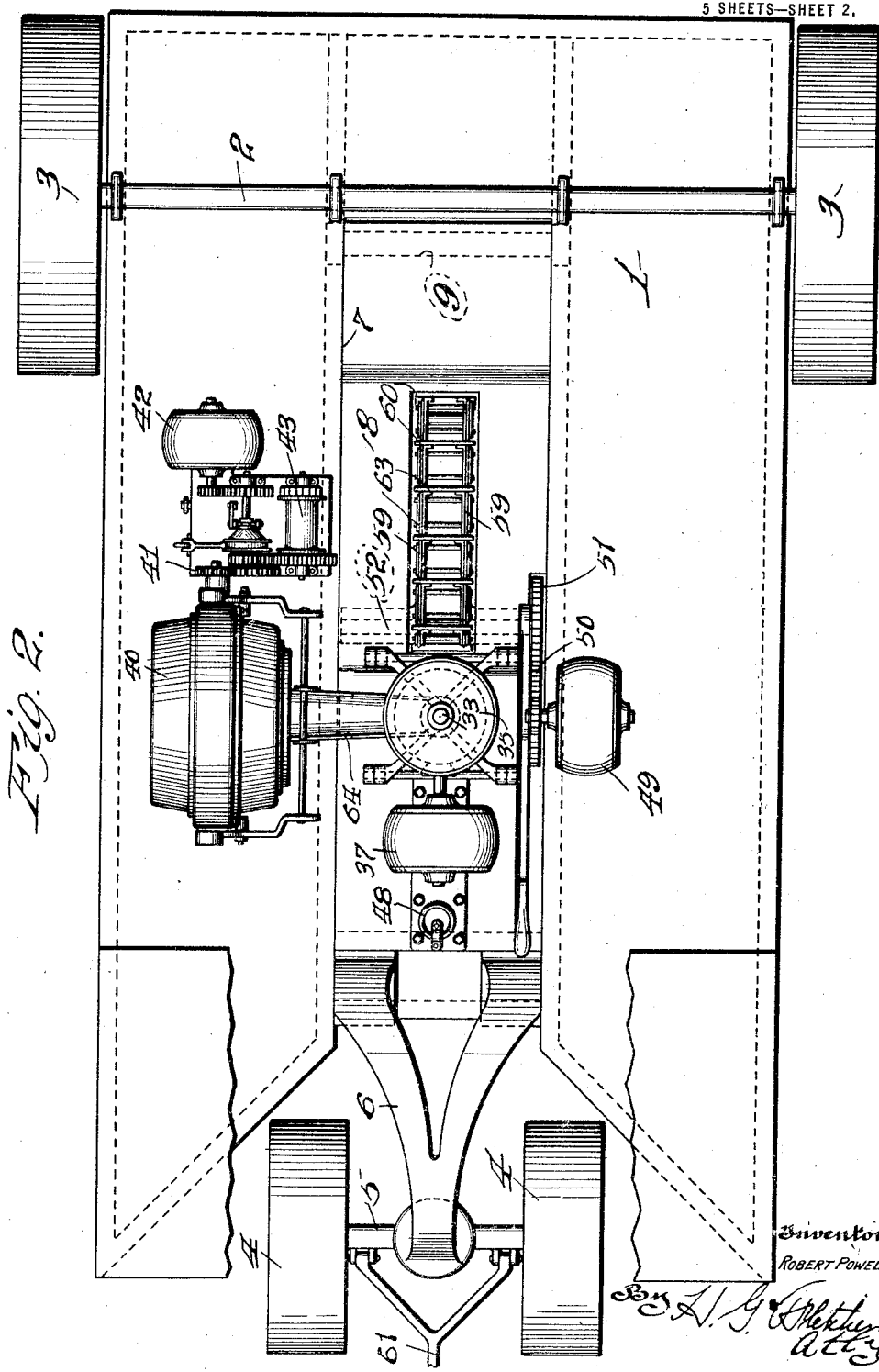

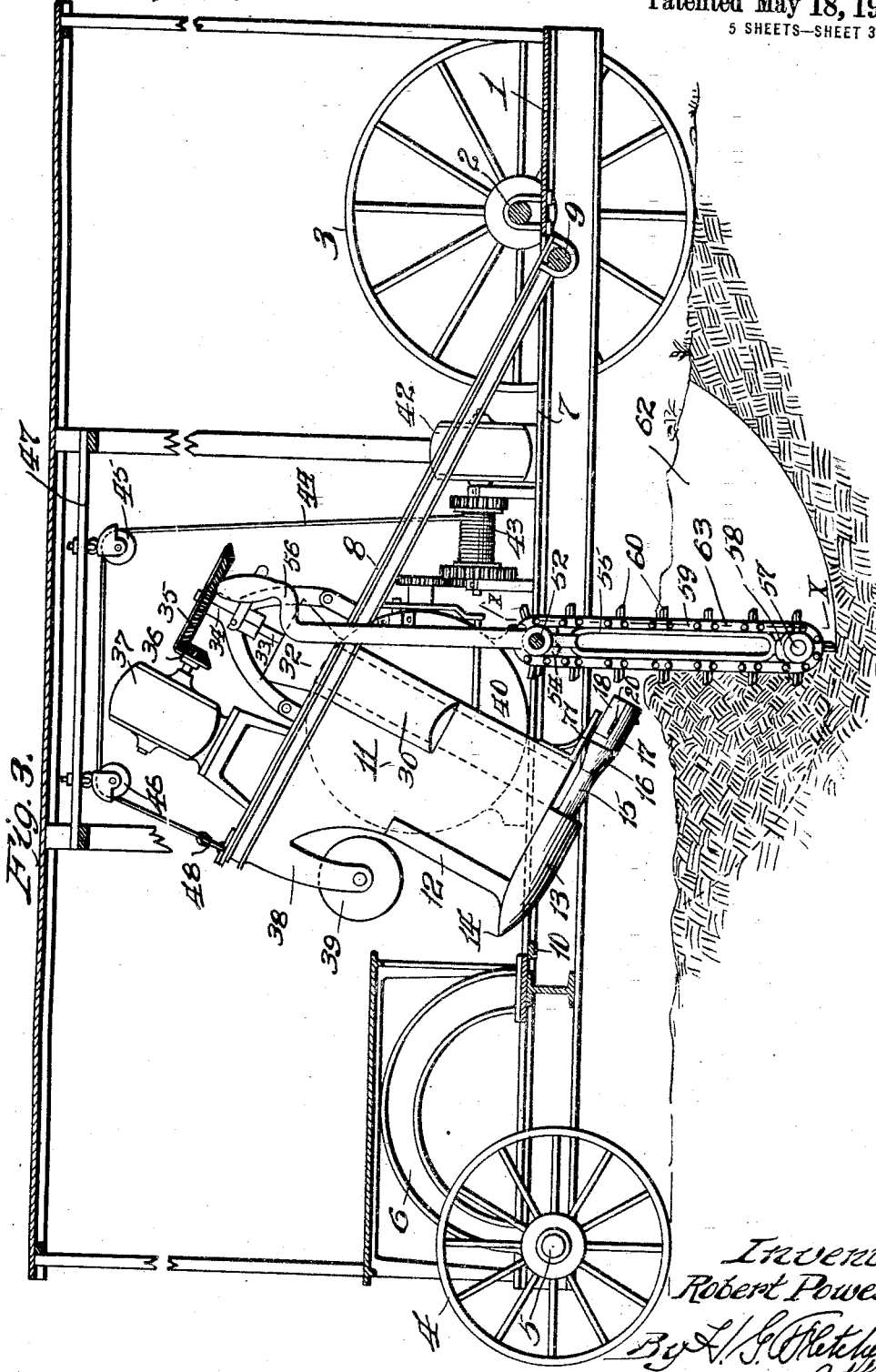

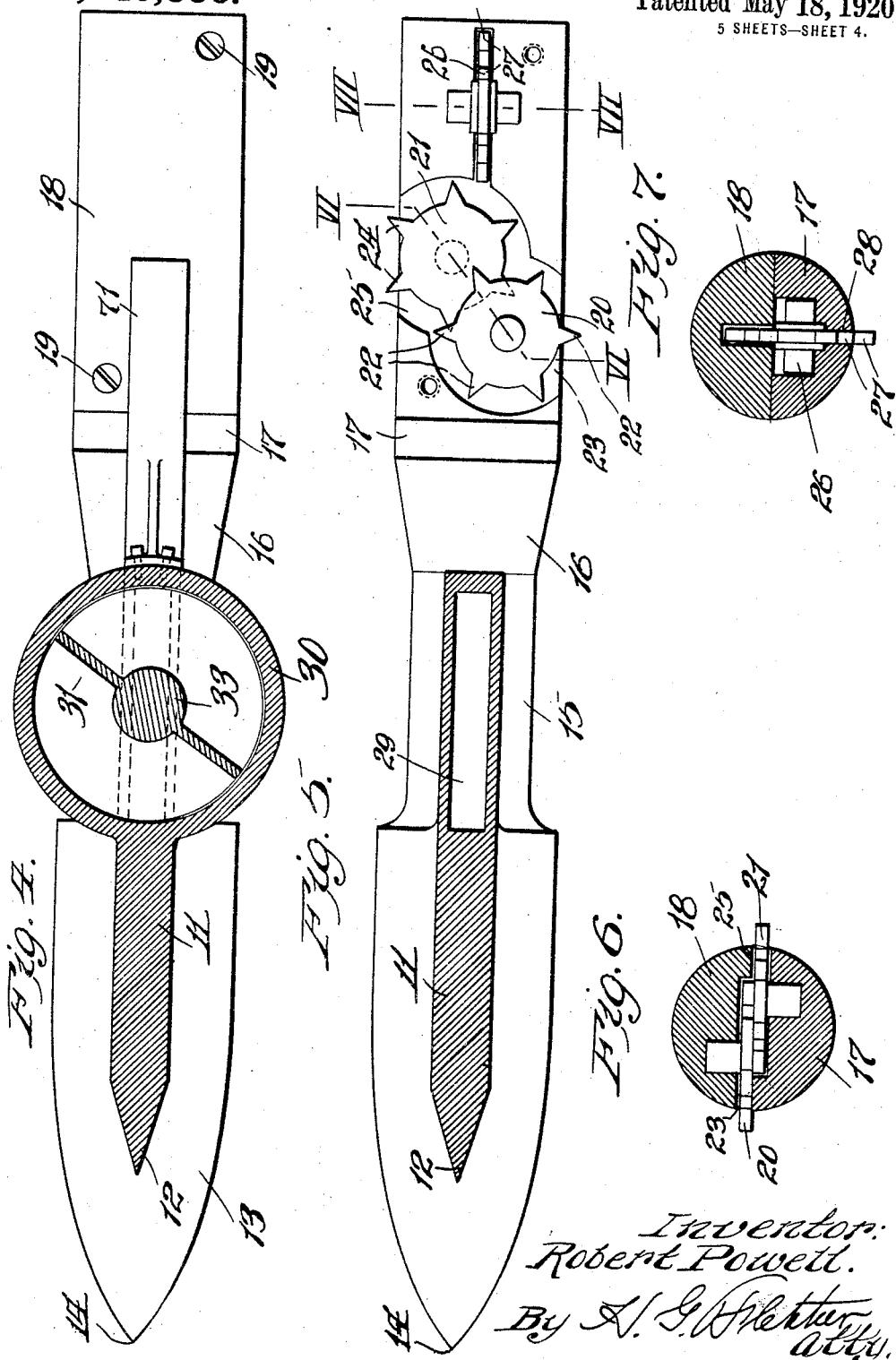

UNITED STATES PATENT OFFICE.

ROBERT POWELL, OF ST. LOUIS, MISSOURI.

APPARATUS FOR MAKING AN UNDERGROUND PASSAGEWAY AND FOR MAKING AND LAYING A PIPE IN THE SAME.

1,340,836.

Specification of Letters Patent.

Patented May 18, 1920.

Application filed January 26, 1918. Serial No. 213,973.

*To all whom it may concern:*

Be it known that I, ROBERT POWELL, a citizen of the United States of America, and a resident of the city of St. Louis and State of Missouri, have invented certain new and useful Improvements in an Apparatus for Making an Underground Passageway and for Making and Laying a Pipe in the Same, of which the following is a specification.

One of the objects of this invention is to provide an apparatus which is capable of making an underground passageway that can be used as a drain or an irrigation passageway.

Another object is to provide an improved apparatus for making and laying an underground pipe as the apparatus is pulled over the ground.

A further object is to provide an apparatus which when propelled on the surface of the ground will form an underground passageway, and in which the instrument used for making the underground passageway is also coöperable with other devices relative to making and laying a pipe which will be engaged against the wall of the passageway.

Other and further objects will appear in the specification and be specifically pointed out in the appended claims, reference being had to the accompanying drawings, exemplifying the invention, and in which, Figure 1 is a side elevation of this improved apparatus showing it in the operation of providing an underground tunnel, and at the same time laying a continuous pipe in the tunnel provided.

Fig. 2 is a plan view of Fig. 1 with the upper structure or canopy removed.

Fig. 3 is a longitudinal sectional view showing the tunneling or passage making device in an elevated position and the digger in operation relative to providing a trench for the introduction of the tunneling device.

Fig. 4 is an enlarged horizontal section taken on the line IV—IV of Fig. 1.

Fig. 5 is an enlarged horizontal section taken on the line V—V of Fig. 8.

Fig. 6 is an enlarged transverse section taken on the line VI—VI of Fig. 5.

Fig. 7 is an enlarged transverse section taken on the line VII and VII of Fig. 5.

Fig. 8 is an enlarged vertical section taken on the line VIII—VIII of Fig. 1.

Fig. 9 is an enlarged section taken on the line IX—IX of Fig. 1.

Fig. 10 is a transverse section taken on the line X—X of Fig. 3, showing the supporting frame of the digger and operating handle relating thereto.

Referring to the drawings, 1 designates the deck of this improved apparatus, said deck being supported by the rear axle 2 and rear wheels 3, and by the front steering wheels 4 and front axle 5, said axle 5 being turnably mounted on the arch frame 6.

Formed in the intermediate portion of the deck 1 is an opening 7, and mounted in said opening is a platform 8, said platform being swingingly mounted at its rear end on the shaft 9, and is supported at its opposite end when in a lowered position by the cross bar 10.

Secured to the underside of the platform 8 is a depending portion 11, said portion 11 adjacent its front end having a shearing or cutting edge 12 formed thereon.

Secured to the underside of the depending portion 11 and extending beyond the front end thereof is a circularly formed tunneling or passage providing member 13, the forward end of said member 13 being pointed as designated at 14. Extending from the rear end of the member 13 is a reduced circularly formed portion 15, said portion 15 at its rear flaring outwardly as designated at 16, and formed integral with the flaring portion 16 is a straight way pressing portion 17.

The member 13 and portions 15, 16 and 17 are circular in cross section, the portions 17 having a removable upper portion 18 which is securely held in place by screws 19.

Revolubly supported between the portions 17 and 18 are a pair of horizontally arranged perforating wheels 20 and 21, the perforating teeth 22 of the wheel 20 extending through the opening 23, whereas the perforating teeth 24 of the wheel 21 extend through the opening 25, said openings 23 and 25 being oppositely disposed.

Located rearwardly of the wheels 20 and 21 is a vertically arranged perforating wheel 26, the teeth 27 of said wheel extending through the opening 28 formed in the bottom of the portions 17. Formed in the depending portion 11 is a vertically arranged passageway 29, the lower end of said passageway being located above the reduced portion 15 of the member 13, the upper end of said passageway communicating with the forcing cylinder 30, in which is vertically arranged a spiral forcing screw 31.

Formed on the upper end of the cylinder 30 is a receiving hopper 32, said receiving hopper being above the removable platform 8. Forming a part of the screw 31 is a shaft 33, the upper end of said shaft being supported in the split bearing 34, and secured to said shaft above said bearing is a horizontally arranged bevel gear 35, said gear meshing with the bevel driving pinion 36 of a motor 37, said motor being mounted on the platform 8.

Depending from the under side of the platform 8 is a support 38 to which is mounted a cutting wheel 39, said cutting wheel being in longitudinal alinement with the cutting edge 12 of the depending portion 11.

Mounted on the deck 1 is a cement mixer 40, the gearing 41 pertaining to said mixer being driven by the motor 42, which is also mounted on the deck 1. Operably related to said motor 42 independently of the mixer 40 is a windlass 43, and mounted on said windlass is a cable 44, said cable passing over pulleys 45 and 46 which are suspended from the upper structure 47, the free end of the cable being secured to the lifting ring 48 which is secured to the forward end of the platform 8.

Mounted on the deck 1 is a motor 49, said motor being arranged transversely of the mixer 40, and operably related to said motor is a train of gearing 50, the last gear 51 in order from said motor being secured to a horizontally arranged shaft 52, said shaft being supported in bearings 53 which are located in the deck 1.

Secured to said shaft 52 are a pair of sprockets 54. Mounted at one end of the shaft 52 is a swinging supporting frame 55, and extending from said frame is a lever 56. Supported by the opposite end of said frame is a shaft 57 on which is mounted a pair of sprockets 58, said sprockets 58 being in alinement with respective sprockets 54, and mounted on each pair of sprockets 54 and 58 is an endless chain belt 59 to which are secured a plurality of shovels 60.

In leading up to the operation of this improved apparatus, from the disclosure shown in the drawings, it will be necessary to have a pulling element such as a tractor to draw the apparatus over the ground, in which instance the apparatus will be coupled to the tractor by the tongue 61, and the tractor having motor power will be capable of generating and supplying electricity for driving the motors 37, 42 and 49. As already stated in the objects of this invention, this improved apparatus is capable of forming an underground passageway, and simultaneous therewith, lining the wall of the passageway so formed with a layer or wall of self hardening plastic material, thereby providing a drain or irrigation pipe, which can be installed without perceptibly disturbing the top surface of the ground, as is the case when the present day system of tiling is carried out, in which the ditch must first be made before the tile can be laid; then the ditch has to be filled in. With this improved apparatus, no wide open mouth ditch is made, as nothing more than a gap is made in the ground as the apparatus is propelled over the ground.

In the operation of this apparatus, a ditch must first be made in the ground for the introduction of the tunneling or passage making member 13, as when the apparatus is being moved from place to place, the deck 8 and parts relating thereto are carried in an elevated position as shown in Fig. 3, but when the place of work is reached such as low farm lands that are to be provided with an underground drain, the tunneling member has to be lowered into the ground to the desired depth. In order to provide the initial aforesaid ditch which is designated as 62 in Fig. 3, the lever 56 is elevated until the extending end of the digger 63, which is comprised of the sprocket wheels 54 and 58, frame 55 and chains 59 engages the surface of the ground. Then the motor 49 and gearing 50 are put in motion, and the lever 56 manipulated upwardly until the curved ditch 62 is provided. The motor 49 and gearing pertaining thereto is then stopped and the digger 63 is returned to its horizontal position as shown in Fig. 1. The motor 42 is then started, and the gearing pertaining to the windlass 43 is set in operation so that the cable 44 will be let out and the platform 8 swung downwardly on the shaft 9 until the platform 8 assumes a horizontal plane with the deck 1, thereby lowering the member 13 into the opening 62.

The tractor is then started, thereby moving the apparatus over ground, and simultaneous therewith, the gearing 41 and mixer 40 are put into operation, the supplies for the mixer being fed thereto by wagons or the like that will keep pace with the speed of travel of the apparatus.

The motor 37 is also put into operation, thereby operating the forcing screw 31 of the forcing cylinder 30, and as the mixed material such as cement is fed from the mixer to the hopper 32 by the swingingly mounted chute 64, the cement or plastic material is forced through the passageway 29 of the depending portion 11 to the reduced portion 15 of the member 13, (see Fig. 8), in which the plastic material will be forced around the portion 15.

As the member 13 is moved under ground on a plane approximately parallel with the surface of the ground, a circular opening 65 is provided, thereby providing an annular pocket 66 around the reduced portion 15, and the plastic material contained in said pocket will be engaged by the flaring portion 16 and pressed against the wall of the opening 65, and the smoothing portion 17 of the member 13 which follows the flared portion 16 in its travel will further press and smooth the material to an even thickness around the underground opening 65, (see Fig. 9), and during the action of the portion 17 on the plastic material, the teeth at the wheels 20, 21 and 26 which extend beyond the periphery of the portions 17 and 18 will perforate the wall 67 of plastic material, thereby providing drain openings 68 in the self hardening pipe just made. Furthermore, the action as just referred to will force portions of the plastic material as designated at 69 into the solid earth around the openings 68, thereby providing anchoring means relative to assisting the pressed layer of plastic material to adhere to the wall of the underground opening 65.

From the aforesaid description and operation it is therefore noted that a continuous pipe can be provided and laid for any length or breadth of acreage desired relative to providing drain pipe for low lands without perceptibly disturbing the surface of the ground, as when the device is in operation, a small fissure gap 70 only will be provided, which will readily fill in, especially by the aid of the elements.

As shown more clearly in Fig. 1, which shows the device in operation, the cutter 39 will break the ground forwardly of the cutting edge 12 of the depending member 30. After the apparatus has reached the end of the pipe line desired, it is obvious that the tunnel member 13 will be elevated from out of the ground ready for the next pipe line to be installed, in which the digging operation by the digger 63 will again be carried out prior to the re-introducing of the tunneling member.

If desired, however, initial ditches can be made manually without the aid of mechanical diggers as related. In order to prevent the plastic material from being forced into the fissure 70, which is made by the cutting edge 12 and depending portion 11, during the plastic material molding operation, a horizontally arranged stopping plate 71 is secured to the rear end of the depending portion 11 above the portions 16 and 17.

What I claim is:

1. In a passage lining apparatus, a member adapted to longitudinal travel, means for forcing a plastic material to said member, means carried by said member for spreading the plastic material around the wall of the passageway through which said member travels, and revolving means carried by said member for forming perforations in the plastic wall provided in the passageway.

2. An apparatus for cementing the wall of an underground passageway comprising a body portion having a rearwardly extending portion of lesser diameter formed integral therewith, a depending member secured to said body portion having a passageway formed therein which communicates with the lesser diametered portion of said body portion, said body portion and the lesser diametered portion connected thereto providing an annular passageway between the wall of the passageway made by said body portion and said lesser diametered portion.

3. An apparatus for cementing the wall of an underground passageway, comprising a member to be moved along said passageway, having a portion formed integral therewith extending rearwardly therefrom which is less in diameter than the passageway in which it is traveling, thereby providing an annular chamber between said rearwardly extending portion and said passageway wall, means for introducing a flow of plastic material to said member and in said chamber, and a smoothing portion formed integral with said rearwardly extending portion for pressing the plastic material against the wall of the passageway.

4. An apparatus for cementing the wall of an underground passageway, comprising a member to be moved along said passageway having a portion extending rearwardly therefrom, which is less in diameter than the passageway in which it is traveling, thereby providing an annular chamber between said member and said passageway wall, means for introducing a flow of plastic material to the annular chamber, and a smoothing portion carried by said member for forcing the plastic material from said chamber and pressing the plastic material against the wall of the passageway, and means for perforating the cemented wall of said passageway carried by said smoothing portion, actuated by engagement with the passageway wall.

5. In a pipe making and laying apparatus, a member to be propelled under ground, means for forcing a plastic material to said member, means carried by said member for spreading the plastic material around the wall of the passageway provided by said member, and a rotatable element having a series of projecting members carried by said spreading means of said member, said projecting members of said rotatable element providing means for perforating the spreaded plastic material.

6. In an apparatus for making an under ground passageway and for laying pipe therein, comprising the combination of a frame, a platform swingingly mounted thereon, an under ground passageway making element depending from said platform, and a digging element swingingly mounted on said frame, said digging element adapted to provide a ground opening for the reception of said passageway making element.

7. An apparatus for providing an under ground passageway and for making and laying a continuous pipe therein, comprising a vehicle, a swingingly mounted platform carried by said vehicle having its hinging end arranged rearwardly thereof, a hollow depending portion carried by said platform, and a wedging member carried by the lower end of said depending portion adapted to travel underground.

8. A member for under ground work comprising a body portion having a pointed front end and a rotatable element having a series of projections carried by said member, said projections of said rotatable element projecting beyond the periphery of said member.

9. A member for under ground work comprising a rounded body portion having a pointed front end, a portion reduced in diameter from said body portion extending from the rear end thereof, and another portion greater in diameter than said lesser diametered portion extending therefrom carrying a pair of rotatable members each having peripheral projections.

ROBERT POWELL.